United States Patent [19]

Checkland et al.

[11] 4,155,690
[45] May 22, 1979

[54] CONTINUOUS PRODUCTION OF CROSS-LINKED POLYETHYLENE

[75] Inventors: John A. Checkland, Pointe Claire; Paul Valois, Oka, both of Canada

[73] Assignee: Northern Telecom Limited, Montreal, Canada

[21] Appl. No.: 910,496

[22] Filed: May 30, 1978

[51] Int. Cl.² .......................................... B29D 23/04
[52] U.S. Cl. .................................... 425/113; 264/170; 425/122; 425/376 B
[58] Field of Search ................... 425/113, 122, 376 A, 425/376 R, 543, 550; 264/170

[56] References Cited

U.S. PATENT DOCUMENTS

| | | | |
|---|---|---|---|
| 3,453,356 | 7/1969 | Kent et al. | 425/113 |
| 3,577,588 | 5/1971 | Chisholm | 425/113 |
| 3,981,649 | 9/1976 | Shimano et al. | 425/113 |
| 4,069,286 | 1/1978 | Greenhalgh | 425/113 |
| 4,091,064 | 5/1978 | Kakinuma et al. | 425/113 |

Primary Examiner—William E. Schulz
Attorney, Agent, or Firm—Sidney T. Jelly

[57] ABSTRACT

Cross-linked polyethylene is continuously produced by injecting dicumyl peroxide (Dicup) into the polyethylene in the mixing barrel of the extruder. The Dicup injection nozzle extends into the flight of the screw of the extruder and the flight is interrupted, or notched, at this position. This enables the Dicup to be injected at a position about half way between the extruder barrel wall and the core of the screw and also avoids pulsed back-pressure on the feed pump for the Dicup. A closely controlled and constant ratio of cross-linking agent to raw polyethylene is obtained.

8 Claims, 4 Drawing Figures

CONTINUOUS PRODUCTION OF CROSS-LINKED POLYETHYLENE

This invention relates to the continuous production of cross-linked polyethylene and is particularly concerned with the production of cross-linked polyethylene by the direct injection of dicumyl peroxide (Dicup) into the polyethylene in the extruder prior to extruding over the conductor of a cable.

Previously the cross-linking agent has been added to the mix in a batch process in which the raw material polyethylene, and additives such as anti-oxidants, fire retardants and colouring pigments, are mixed. After a predetermined period of mixing, with the batch at the desired temperature, the cross-linking agent is added. After further mixing, the mix is removed from the Banbury, cooled and stored as a cross-linkable raw material for future use.

However, such a process is not fully satisfactory for the use of Dicup as a cross-linking agent. The agent is volatile and considerable variations can occur, from mix to mix, in the amount of cross-linking agent actually present. That is, the ratio of agent to the polyethylene varies and can result in unsatisfactory raw material, and hence an unsatisfactory finished product.

In the present invention, the Dicup is injected or introduced into the polyethylene, which will include any additives, at a particular position in the extruder in which the material is prepared for extrusion and from which the material is extruded as an insulation coating on a conductor. The extruder has a spiral screw which both feeds and mixes the material in the barrel of the extruder, and the flight of the spiral screw is notched at a position aligned with the injection port for the Dicup. This feature is important to avoid unacceptable back pressures on the Dicup pump, which should be a positive displacement constant flow type.

The invention will be readily understood by the following descriptions in conjunction with the accompanying drawings in which.

Figure 1:
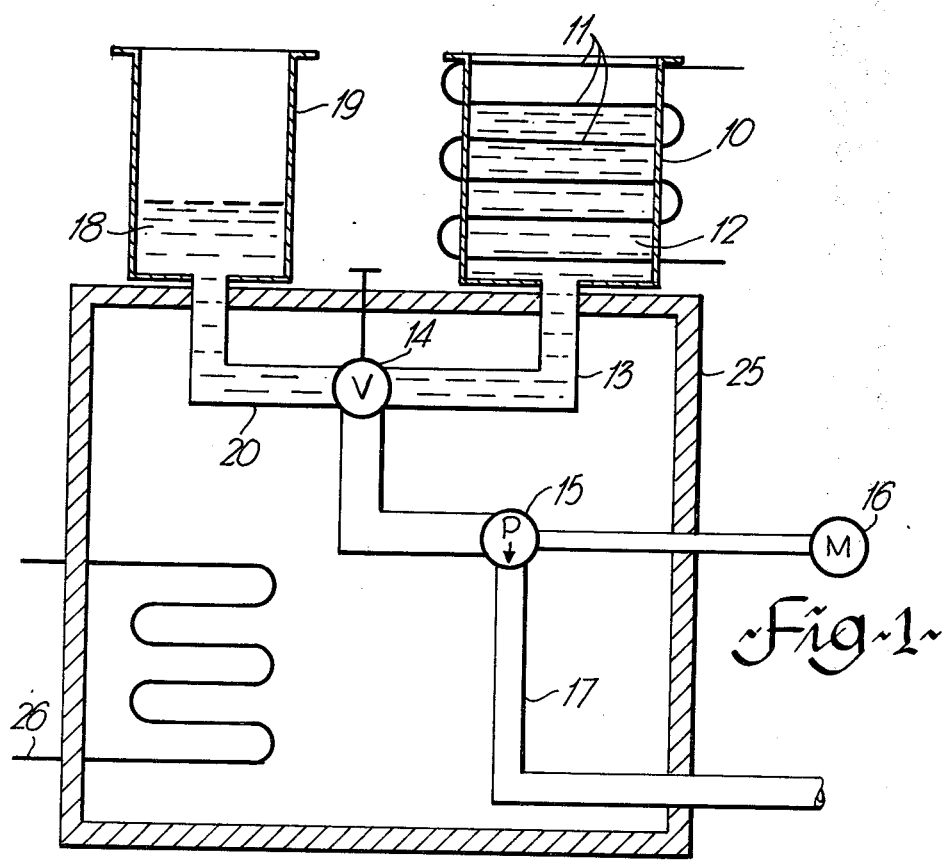
FIG. 1 is a diagrammatic cross-section through a form of apparatus for preparing the Dicup for injection into the extruder.

As illustrated in FIG. 1, the Dicup cross-linking agent is prepared for injection into the extruder by melting a raw material, in an original solid or crystallized form, in a reservoir 10 heated by a heating unit 11. The molten agent 12 flows down a pipe 13 to a valve 14. In one open position, valve 14 permits flow of the agent to metering pump 15 - driven by motor 16. From the pump 15 the agent is fed via pipe 17 to the extruder.

The agent 12 in the reservoir 10 is maintained molten by the coil 11. A typical coil has hot water at 130° F. circulated through it. The pump 15 is a constant flow positive pressure type, one example being a pump with a 3 mm cylinder at 150 strokes per minute. The flow from the pump is accurately controlled so that the correct rate of injection of agent is always obtained.

The valve 14 can be changed over to an alternative open position, when a flushing agent 18 in tank 19 is fed through the system via pipe 20 and pipe 17. The pipes and fittings are preferably of stainless steel to minimize interaction with the Dicup.

The pipes 13 and 20, and valve 14, pump 15 and some of pipe 17 are enclosed in a heated chamber 25, heated by coil 26. If any considerable length of pipe 17 extends outside the chamber 25 it would preferably have a warming jacket around it to maintain the agent at the desired temperature.

Figure 2:
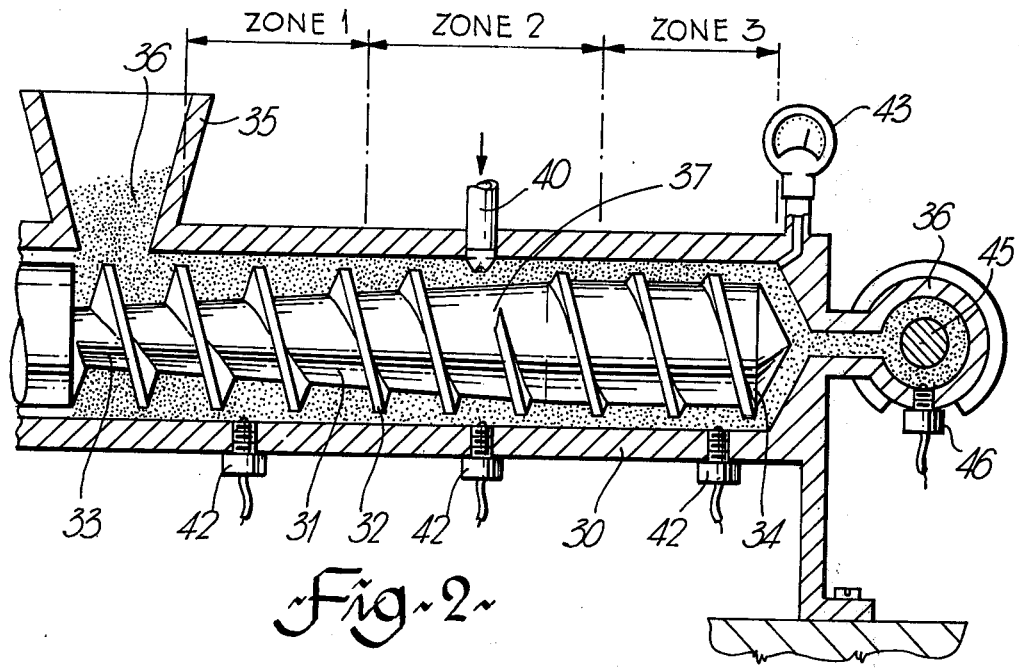
FIG. 2 is a diagrammatic longitudinal cross-section through a typical extruder barrel.

FIG. 2 illustrates the barrel 30 of an extruder with a rotatably mounted screw 31 having a spiral flight 32. The central body or core of the screw is tapered from a minimum diameter at the inlet end 33 to a maximum at an intermediate position 34, thereafter containing parallel. The flight 32 is of a constant diameter at its periphery and thus the radial depth of the flight decreases from the inlet end 33 to the intermediate position 34. A raw material inlet hopper 35 is provided at the inlet end.

The barrel length defines generally three zones, as indicated. Zone 1 extrudes from the hopper for about one-third of the barrel length from the hopper. Zone 2 extrudes over approximately the centre third of the length of the barrel from the hopper to the outlet end and zone 3 extends for a further third. From the outlet end of the barrel material passes to the extruding head 36.

Raw material - polyethylene in pellet form - is fed into the hopper 35, as indicated at 36. The pellets are fed into the barrel by the screw and are both transported and formed into a mass as a result of the decrease in volume as the central body or core of the screw increases in diameter. Zone 1 is generally concerned with this transport and forming into a mass. In zone 2 the increased compression of the material by the continued reduction in volume creates a melting zone. Zone 3 generally constitutes a mixing zone.

The agent is injected in zone 2 and the position of injection is important. If injected too near the inlet, some of the agent can be lost by escape of vapour through the pellets and out of the hopper 35. Further, the agent can act as a lubricant on the pellets preventing proper massing of the pellet material, which can cause jamming. Injection too near the outlet end will not provide sufficient mixing. The flight 32 of the screw 31 is notched, as by removing the flight for a short distance at 37. This permits continuous, uninterrupted, injection of the agent and prevents back pressure being applied to pump 15 each time the screw 31 revolves.

Figure 3:
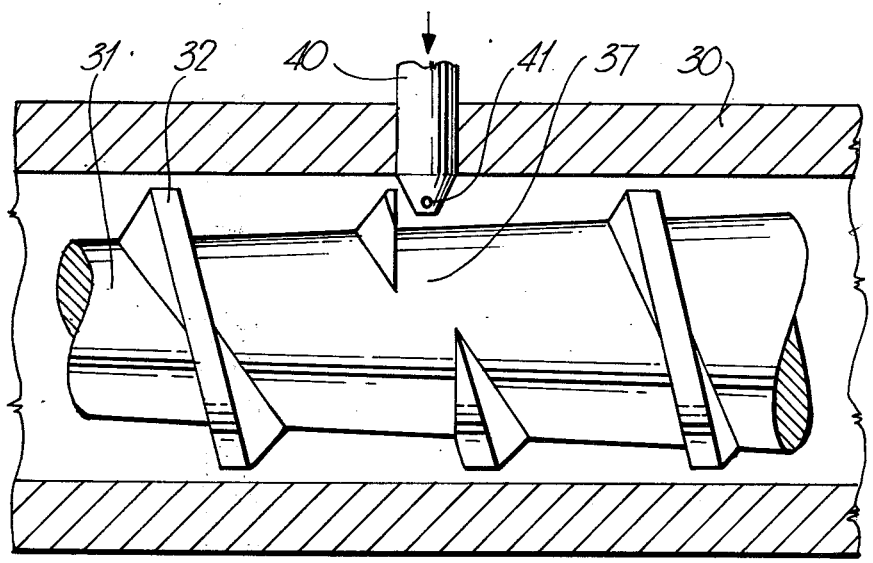
FIG. 3 is an enlarged cross-section of the Dicup injection position in the arrangement of FIG. 2.

As shown in FIG. 2, the agent is injected at approximately the centre of zone 2, by an injector nozzle 40. In the particular example, the nozzle 40 is of stainless steel and has an orifice 41 of 0.02" diameter in one side. The nozzle protrudes into the barrel 30 so that the orifice is at a position about half-way between the barrel wall and the core of the screw 31. This is seen more clearly in FIG. 3, where the orifice is indicated at 41. The orifice is in the side of the nozzle so that injection is laterally, that is normal to the axis of the barrel of the extruder. The orifice can be on either side of the nozzle. Also, the nozzle is of oval cross-section beyond the wall of the barrel to minimize the dead volume behind the nozzle, that is on the downstream side.

The extruder is maintained at a temperature of about 240° F. to 250° F., and the Dicup is injected at about 130° F. The temperature of the material in the different zones is monitored by means of thermocouples 42 and the pressure in the barrel at the outlet end is indicated by a pressure gauge 43. From the barrel 30 the mixed compound is fed to the extruding head 44 where the compound is extruded as an insulating layer on a conductor 45. The temperature in the extruding head is monitored by thermocouple 46. The temperature in the barrel and the extruding head are controlled by heating means, not shown.

Figure 4:
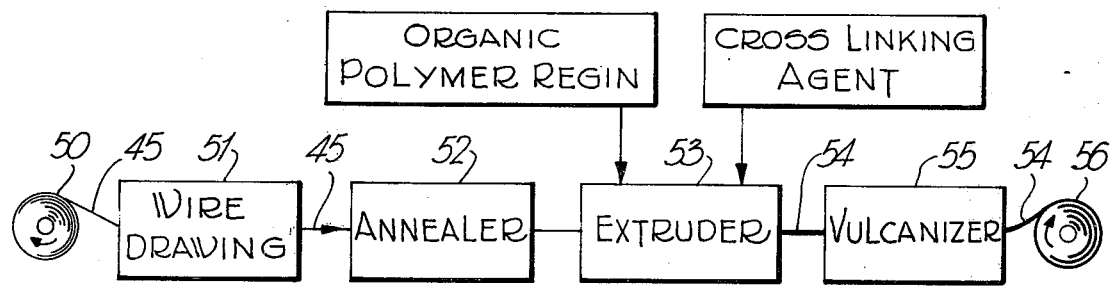
FIG. 4 is a schematic diagram of the system from conductor forming to conductor covering.

FIG. 4 illustrated diagrammatically one particular flow path or system incorporating the present invention. Wire to form the conductor, generally of a size larger than that of the conductor, is paid-off from a spool 50 and passes through a drawing machine 51 where the wire is drawn down to the conductor diameter. The conductor 45 then passes through an annealing apparatus 52 and then to the extruder, indicated generally at 53. The coated conductor 54 is then fed through a vulcanizer 55 where the coating is cured. The coated conductor is then wound up on a spool 56.

The Dicup cross-linking agent is added to the polyethylene at a rate of from about 1½% to about 3% by weight of the polyethylene, with a preferred rate of about 2% which will give a gel content of about 75%. Other additives, such as antioxidants and fire retardants can be added to the polyethylene in the extruder barrel. For accurate and repeatable results, the injection rate of the Dicup into the polyethylene must be maintained constant and this is obtained by the use of a positive displacement, constant flow pump. The flow rate of the pump can be controllably varied, so as to be able to adjust the rate of injection of the Dicup but once set, this remains constant. To prevent back pressure on the pump, the removal of the section 37 from the flight is necessary and is an essential feature for acceptable operation.

What is claimed is:

1. Apparatus for the continuous production of cross-linked polyethylene, comprising:
   an extruder including an extruder barrel having inlet and outlet ends and a mixing and feeding screw extending axially in the barrel, said barrel including three zones;
   said screw including a core and a spiral flight on said core;
   a raw material inlet at the inlet end of said barrel for feeding polyethylene to a first of said zones;
   an injection nozzle extending through a side wall of the barrel at a middle one of said zones for injection of dicumyl peroxide cross-linking agent into the barrel;
   said flight of said screw including a notch circumferentially aligned with said nozzle;
   said nozzle extending inwardly from said side wall part way into the depth of said flight, an orifice substantially at the inner end of said nozzle;
   an outlet for mixed material at the outlet end of the barrel for feeding mixed material from the third zone.

2. Apparatus as claimed in claim 1, including a positive displacement constant flow pump, the flow rate being controllably variable, said pump connected to said nozzle.

3. Apparatus as claimed in claim 1, said orifice directed normal to the axis of the barrel.

4. Apparatus as claimed in claim 2, comprising:
   a heated reservoir for melting the raw crosslinking agent; and
   a heated chamber enclosing said pump, a control valve between said reservoir and said pump and connecting pipes.

5. Apparatus as claimed in claim 2 or 4 including an extruding head and means for feeding a conductor through the extruding head for extrusion of an insulating layer of polyethylene thereon, and vulcanizing means for vulcanizing said layer.

6. Apparatus as claimed in claim 1, including thermocouples for measuring the temperature of the material in the barrel at predetermined positions.

7. Apparatus as claimed in claim 1, including means for measuring the pressure in said barrel.

8. Apparatus as claimed in claim 1, said core of said screw having a diameter increasing from a minimum at said inlet end to a maximum at a position intermediate said inlet and outlet ends.

* * * * *